Dec. 5, 1944.                    Z. D. RUBEN                    2,364,099
              MECHANISM FOR THE INTERCONVERSION OF
                  RECIPROCATING AND ROTARY MOTION
                       Filed Dec. 30, 1942
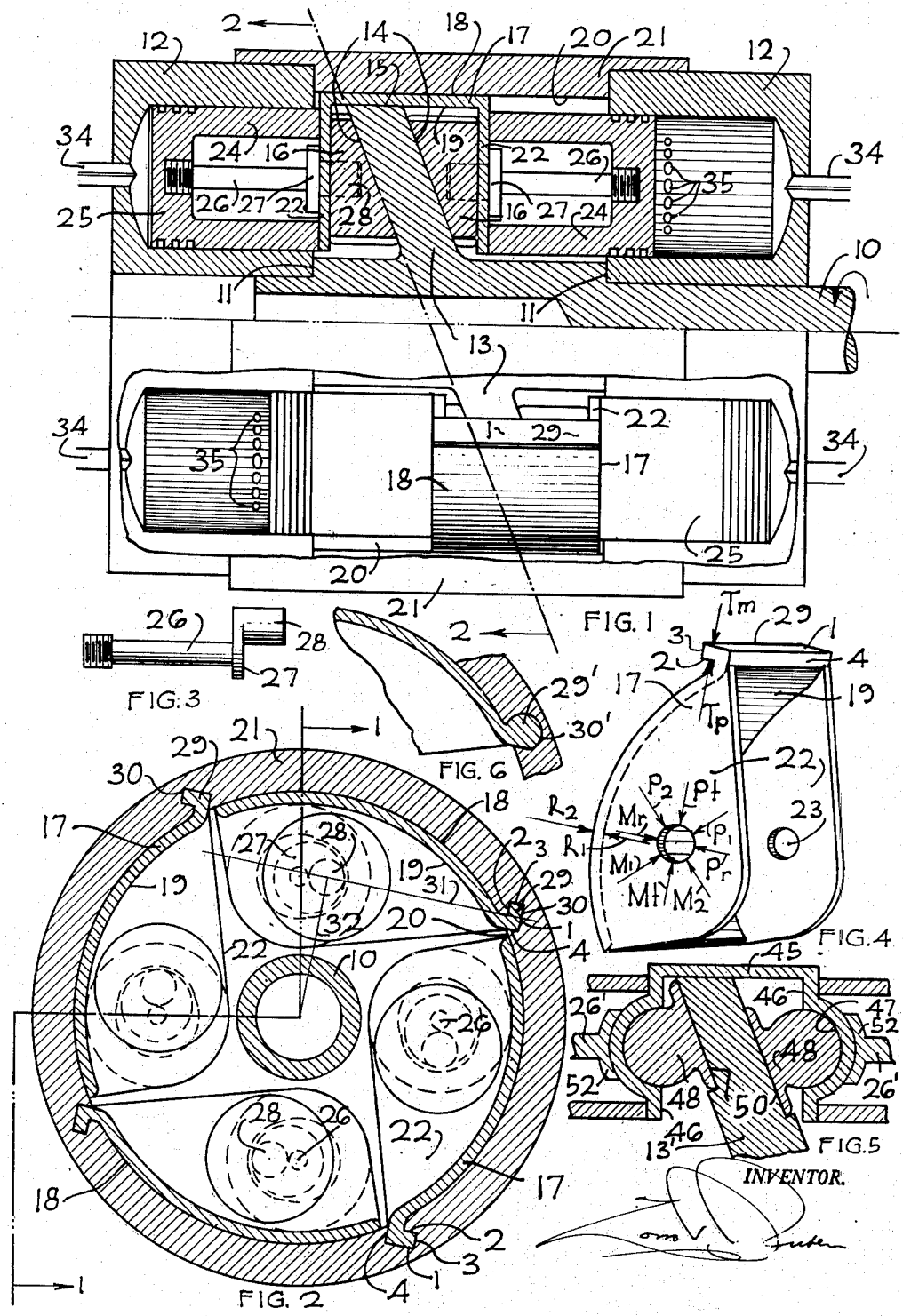
INVENTOR.

Patented Dec. 5, 1944

2,364,099

UNITED STATES PATENT OFFICE 2,364,099

MECHANISM FOR THE INTERCONVERSION OF RECIPROCATING AND ROTARY MOTION

Zorro D. Ruben, Chicago, Ill.

Application December 30, 1942, Serial No. 470,679

16 Claims. (Cl. 74—56)

The object of this invention is to provide a mechanism for interconverting rotary and reciprocating motion, which will yield similar benefits in applications to engines, pumps, compressors, and other useful tools of industry. Reciprocating pistons are desirably employed in such devices.

My invention consists essentially in the means employed to coact with a reciprocating piston, a rotating axial cam mounted on a drive shaft, and a stationary casing enclosing same.

The means described in this specification implements the efficient application of a well-known mechanical device often referred to as a "crankless" mechanism. This mechanism, so implemented, accomplishes a broad objective; the reduction of size and weight for a given displacement or horsepower. Efficient devices of the character mentioned must operate well at highest speeds, with good dynamic balance and low frictional losses. The objective of reduced size and weight demands that the above characteristics be fulfilled with minimum stresses upon all members.

Regardless of the means employed for interconverting the motion of reciprocation of a piston and rotation of a shaft, i. e., whether crankless or otherwise, the overall dimensions of a device employing any such means depend on two variables:

1. The overall length, with piston at bottom center, from top of cylinder to point of bearing upon the rotating member.

2. The arrangement, in group, of a plurality of cylinders.

Thus we find that a radial arrangement about a shaft, combined with a piston and cylinder assembly in which the piston and connecting rod are a minimum length with respect to the bore and stroke, provides the smallest size and weight for a given displacement.

The overall length mentioned above is governed by the side thrust between piston and cylinder wall as follows:

The shorter the connecting rod relative to the stroke, the greater the side thrust. Also, the shorter the piston relative to the bore, the greater the resulting unit pressure on the side walls. The means, coacting with the reciprocating, rotating, and stationary elements, which is the essential feature of my invention, substantially eliminates side thrust of the piston proper. This permits a reduction of the overall length, and a larger ratio of bore to stroke. Inasmuch as displacement varies as the square of the bore, this condition is a factor in the accomplishment of the objective named herein.

Operating speeds are limited by the weight of reciprocating parts, the inertia forces of which will, as the speed is increased, exceed the forces due to chamber pressures.

The reduction of weight of reciprocating parts attached to the piston, of my invention as compared with prior arts, increases the allowable speed and consequently the output of an engine or pump of given dimensions within a given interval of time. In earlier arts, crankless mechanisms have suffered from frictional power losses due to the reactions caused by lateral forces, which are transmitted to the piston or bridge member because of the constant angular contact of the bearing upon the axial cam. In conventional crank and connecting rod engines, the connecting rod angle with the axis of reciprocation varies from zero at top or bottom center to a maximum at the half stroke. Means have been earlier presented, in the art of constructing crankless mechanisms, of supporting radially lateral forces upon the axial cam, when directed inwardly upon the shaft. However, components normal to a radius to the shaft caused undesirable reactions upon the axial cam and casing, which, in most cases, contributed to the excessive frictional losses above mentioned. An essential feature of this invention, therefore, is the provision of a bridge or yoke, which is light in weight and also supports tangential components of lateral forces without introducing undesirable reactions of the yoke against the axial cam or casing.

The invention, briefly described, includes a reciprocating unit operable in conjunction with an axial cam. In this instance the unit comprises a number of pistons, the opposite pistons on opposite sides of the axial cam being coupled together by a yoke member. The coupling between each yoke and its two pistons is such as to permit a small relative motion between the yoke and each of the pistons in any direction perpendicular to the axis of symmetry of the piston, that is, perpendicular to the longitudinal axis of the piston. Forces are transmitted between each piston and the yoke member by a short relatively flexible connecting rod. Any appreciable flexure of the yoke member is prevented by contact of the end of the piston skirt with a face or ear of the yoke. This means for preventing flexure favorably affects the design of a comparatively thin and therefore light yoke.

Each yoke member consists of three elements as follows:

1. A thin walled cylindrical segment interposed between the axial cam and a stationary casing being a unit of a complete bearing around the axial cam.

2. A longitudinal lug or projecting lip on the side of a segment, operating in a slot in the casing to maintain the position of the yoke with respect to the casing and support components of forces acting in a tangential direction.

3. A pair of end faces or ears each in supporting contact with the skirt of a piston and rigidly connected to the piston rod on one side and in contact on the other side with one face of a rotatable member sliding on the axial cam.

A pair of rotatable wedge segments of cylinders or shoes are interposed between the end faces or ears of the yoke and bearing surfaces of the axial cam, journalled upon a stud integral with the end faces.

The attainment of the above and further objects of the present invention will be apparent from the following specification taken in conjunction with the accompanying drawing forming a part thereof.

In the drawing:

Figure 1 is a longitudinal sectional view of an engine embodying the present invention, said view being taken along the line 1—1 of Figure 2, with certain parts broken away to illustrate the interior construction;

Figure 2 is a section taken along the line 2—2 of Figure 1;

Figure 3 is a plan view of the connecting rod of the engine of Figure 1;

Figure 4 is a perspective view of one of the yokes of the engine of Figure 1 and a "free body" diagram illustrating the points of application of the various lateral forces and the reactions maintaining lateral equilibrium of these forces;

Figure 5 is a fragmentary sectional view of a modified form of yoke and connection between the yoke and piston rod; and Figure 6 is a fragmentary sectional view of a modified form of connection between the yoke and the casing.

Referring now to the drawing, 10 designates a rotatable shaft having shoulders 11—11 thereon locating the same in cylinder blocks 12—12. The cylinder blocks may be of any standard construction. In the present instance each cylinder block has four identical cylinders formed therein, the cylinders being located 90° apart, with the cylinders on the two opposite blocks in axial alignment with one another. Integral with the shaft is a substantially inclined collar 13, known as an axial cam or swash plate. Opposite surfaces 14 of the axial cam are plane surfaces and the surface 15 of the plate is a part of a cylindrical surface. The plate is of a substantial thickness, as may be seen from the drawing. The plane surfaces 14 of the axial cam are in sliding contact with rotatable shoes 16 carried by reciprocating bearing assemblies or yokes 17 grouped around the shaft, there being four such yokes 90° apart.

Each yoke has opposite surfaces 18 and 19 which are segments of cylinders coaxial with the shaft 10. The surface 18 reciprocates in sliding contact with the inner cylindrical surface 20 of a stationary cylindrical casing 21. The surface 19 of each yoke 17 is supported by and is in sliding contact with the peripheral cylindrical surface 15 of the axial cam. Each yoke has a pair of ears 22—22 integral therewith, each ear having a perforation 23 therein. The ear 22 is adjacent to and adapted to be supported by the cylindrical skirt 24 of a piston 25 that reciprocates in the cylinder block. The inner surface of each ear 22 is in rotational contact with the wedge-shaped cylindrical shoe 16.

The ear 22 of the yoke 17 is connected to the associated piston 25 by means of a connecting rod 26 whose longitudinal axis is coincident with the longitudinal axis of the piston. The connection is illustrated by a tapped hole in the head of the piston. The piston is tightly screwed onto the threaded end of the rod. The connecting rod 26 has a flat circular plate 27 integral therewith and a short cylindrical stud 28 integral with the plate 27 and eccentric with respect to the center of the connecting rod 26. The stud 28 is preferably located eccentric to the longitudinal axis of the rod 26 in a direction opposite to the direction of rotation of the axial cam, that is, on the entering side with respect to the motion of the axial cam. The stud 28 acts as a journal for the shoe 16. The plate 27 is rigidly secured to the ear 22 in any desired manner as, for instance, by a series of screws or by welding. Each yoke is provided with a longitudinal projection or lip 29 which locates the yoke in a corresponding slot 30 in the casing 21, as may be seen from Figure 2. Each projection 29 is preferably located on a line 31 which passes through the associated stud 28 and is perpendicular to a line 32 from the center of the shaft 10 to the center of the associated stud. The projection 29 is located on the line 31 in a direction from the stud opposite to the direction of rotation of the axial cam, that is, on the entering side with respect to the motion of the axial cam.

The projection 29 comprises four surfaces 1, 2, 3 and 4 performing functions as follows:

Surfaces 1 and 2 support tangential components of lateral forces as will be further explained.

Surfaces 3 and 4 maintain the position of the lip in the casing to control the position of the resultant radial reactions.

Fuel injection nozzles 34 and air scavenging ports 35 are provided to permit operation as a Diesel type engine. The ports 35 of each cylinder are in two sets, one of which sets leads to a source of compressed air and the other of which leads to the atmosphere.

Components of forces transmitted between the piston and axial cam by the agency of the rotatable shoe 16 may be referred to as lateral and longitudinal. The lateral component acts in a plane at right angles to the longitudinal axis of the piston, and is a vector which varies in magnitude and direction but is directed at all times through the center of the stud 28.

The various conditions of chamber pressures and inertia occurring in engines, and pumps or compressors may be generalized as follows:

1. Inertia forces of the double-acting piston assembly react upon the yoke from the bearing of the piston near bottom center, starting 90° before bottom center and ending 90° after, with a maximum at bottom center directed radially towards the casing. The radial component is therefore at all times supported by the casing, and the tangential component by either vertical surface of the yoke lip.

2. Power strokes create lateral forces resulting in tangential components directed opposite to the rotation of the axial cam.

3. Pumping strokes create lateral forces resulting in tangential components directed with the rotation of the axial cam.

4. Power and pumping strokes create lateral forces resulting in radial components operating in either direction, i. e., which must be supported by the casing or the axial cam.

In Figure 4, $M_r$ is a radial component of a power stroke, $M_t$ a tangential component, and $M_1$ and $M_2$ represent lateral forces due to power strokes. $P_r$ and $P_t$, $P_1$ and $P_2$ are corresponding components of pumping strokes.

The reaction of the casing against the lip due to $M_t$ is indicated by $T_m$. $T_p$, similarly, is the reaction due to $P_t$. $R_2$ represents the reaction of the casing supporting $P_r$, and $R_1$ represents the reaction of the axial cam supporting $M_r$.

Tangential forces of friction between the axial cam and the yoke have been neglected in the above description as have small forces parallel to $R_1$ and $R_2$ supporting the lip at 3 and 4. The existence of the reaction $R_1$ or $R_2$ parallel to the radial components is controlled by locating the lip accurately in the casing slot between surfaces 3 and 4.

The construction of the yoke 17 and the connection of the same to the piston, in accordance with the principles of the present invention, result in seven immediate improvements, to-wit:

1. Side thrust of the piston against the cylinder walls is reduced

In conventional crank and connecting rod engines this force is a maximum near the half stroke, while in the usual "crankless" devices it is a maximum near top center and roughly equal (for an equivalent angle) at half stroke to that of conventional engines. In the machine of the present invention the piston rod as specified and illustrated is relatively slender, being designed as a column without end moment. This allows some movement of the yoke in a direction at right angles to the axis of the piston, so that the casing or axial cam supports the side thrust, and the clearance motion of the yoke communicates only slight transverse forces to the piston.

2. Large bearings having low frictional loss are provided for high speed, high pressure operation By offsetting the shaft or stud that supports the rotatable bearing wedge, with respect to the piston rod, the reaction of the axial cam pressure against the bearing occurs behind the center of the bearing and allows wedge film lubrication. Also the surface of the shoe in contact with the yoke may be designed with slightly tapered lands in accordance with the principle that wedge film lubrication will form between two surfaces that are supported in slightly inclined positions. Lubricant may be introduced to the cored center of the shaft and flow to the necessary parts by centrifugal force through oil holes drilled in the axial cam and yoke members.

3. Light weight yoke construction

All sections of the yoke may be designed as relatively thin walls as for one reason they are supported against lateral deflection by large area contacts on all sides. For example: The piston rod collar 27 on one side of the ear 22 and the rotating shoe 16 on the other side of the same ear; the casing 21 on the outer face 18 of the yoke and the axial cam periphery inside face 19.

4. Cooperative yoke and piston support

The piston is supported against tipping when its length of contact with the cylinder walls is a minimum (at bottom center) by its contact of the piston skirt with the adjacent ear 22. Conversely, when drawn by the yoke at top center the piston aids in support of the adjacent ear 22 against outward bending.

5. Reduction of pressure on axial cam and casing

The yoke projection 29 which slides in a casing slot supports tangential components of forces on the bearings without introducing a resultant force on the axial cam or casing.

6. Improvement in bearing support of the axial cam

Torsional vibrations of the axial cam and shaft are dampened by contact with the cylindrical section of the yokes, which form a complete bearing for the axial cam. Each cylindrical bearing section of the respective yokes also provides wedge film lubrication by controlling the location of the radial reaction, as previously described. Further improvement may be effected by slightly tapering the thickness of the cylindrical segments from a minimum section at the projecting lip to a slightly heavier section at the opposite end.

7. Yoke supported against lateral tilting

Longitudinal forces causing acceleration of the yoke parallel to the piston axis normally tend to tilt the yoke sideways in a tangential plane, when the tangential support is in or near this plane but eccentric to the piston axis, as is the condition in the preferred location of the lip 29. However, in the present invention the approximately 90° included angle of the cylindrical yoke segment and the existence of a radial component of the longitudinal force causing the segment to be supported by the axial cam or casing maintain the alignment of the yoke and minimize frictional resistance of the lip in the slot, thus minimizing the tendency for the lip to bind in the casing slot.

The stud 28 is located eccentrically of the rod 26 as one method of providing for wedge-shaped oil film lubrication between the shoe 16 and the axial cam. The stud 28 may, if desired, be located with its center coincident with the center of the connecting rod 26. In that construction the collar 27 is not eliminated.

The wedge oil film effect may then be obtained by tapering the ear in thickness so that the end opposite the lip 29 is thicker in the order of several thousandths of an inch and thus exerts a greater pressure, through the shoe, upon the axial cam.

While the apparatus of Figure 1 employs wedge-shaped bearing shoes, it is within the purview of the present invention to use bearing shoes of specifically different shapes known in the art. By way of example, in Figure 5 there is illustrated a yoke 45 which corresponds to the yoke 17 of Figure 1, differing therefrom only in that the ears 46—46, which correspond to the ears 22—22 of Figure 1, are curved to provide on one side a hemispherical socket 47 for a bearing shoe 48, of the Michell type, such as is shown, for instance, in United States Patent No. 1,781,069. The bearing shoe 48 includes a ball or sphere that fits into the hemispherical socket, and at its opposite end has a flat bearing surface 50 that bears against an axial cam 13' that corresponds to the axial cam 13 of Figure 1. The flexible piston rod 26' is provided with a curved end plate 52 that is welded or otherwise rigidly secured to the back surface of the ear 46. In other respects the yoke 45 of Figure 5 is the same as the yoke of Figure 1.

In the structure of Figure 2 the yoke 17 has a small amount of pivotal movement at the lip 29 in the slot 30, an amount of such movement to permit turning of a few thousandths of an inch to take up clearance between the yoke and the casing 21 and to take up clearance between the yoke and the axial cam. If desired, the lip 29 may be of a specifically different shape, and the slot 30 of a complementary shape. By way of example, the lip may be cylindrical, as illustrated at 29', and the slot correspondingly shaped, as illustrated at 30' in Figure 6, the lip 29' acting in the slot 30' in the same manner as described in connection with Figures 1 and 2.

In compliance with the requirements of the patent statutes I have herein shown and described a few preferred embodiments of the present invention. It is to be understood that the invention is not limited to the precise constructions here shown, the same being merely illustrative of the principles of the present invention. What is considered new and desired to be secured by Letters Patent is:

1. In combination, a rotatable shaft, an axial cam secured thereto, a piston parallel to the shaft, a fixed casing enclosing the axial cam; a movable yoke member attached to the piston and straddling the axial cam, said yoke comprising a cylindrical segment between the periphery of said axial cam and the casing, a pair of ears forming end faces on said yoke member; bearings between the ears and opposite faces of the axial cam, and cooperating guide surfaces on the yoke and on the casing for guiding the motion of the yoke, said guiding surface being located substantially on a plane which passes through the center of the bearings and is at right angles to a radius from the center of the shaft to the center of the bearings.

2. In combination, a rotatable shaft, an axial cam secured thereto, a piston parallel to the shaft, a fixed casing enclosing the axial cam; a movable yoke member attached to the piston and straddling the axial cam, said yoke comprising a cylindrical segment between the periphery of said axial cam and the casing, a pair of ears forming end faces on said yoke member, bearings between the ears and opposite faces of the axial cam, and cooperating guide surfaces on the yoke and on the casing for guiding the motion of the yoke, said guide surfaces being located on the entering side, with respect to the motion of the axial cam, of the yoke, and substantially on a plane which passes through the center of the bearings and is at right angles to a radius from the center of the shaft to the center of the bearings.

3. In combination, a rotatable shaft, an axial cam secured thereto, a piston parallel to the shaft, a fixed casing enclosing the axial cam; a movable yoke member straddling the axial cam, said yoke comprising a cylindrical segment between the periphery of said axial cam and the casing, a pair of ears forming end faces on said yoke member; bearings between the ears and opposite parallel faces of the axial cam, means connecting the piston to one of said ears by a connection allowing clearance motion between the piston and the ear in a plane at right angles to the longitudinal axis of the piston, and cooperating guide surfaces on the cylindrical segment and on the casing and parallel to the longitudinal axis of the piston for guiding the motion of the segment, said guide surfaces being located on the entering side, with respect to the motion of the axial cam, of the cylindrical segment and substantially on a plane which passes through the center of the bearings and is at right angles to a radius from the center of the shaft to the center of the bearings.

4. In combination, a rotatable shaft, an axial cam secured thereto, a plurality of pistons parallel to the shaft, said pistons being all on the same side of the axial cam and uniformly spaced around the shaft, a fixed casing enclosing the axial cam; a movable yoke member attached to each piston and straddling the axial cam, each yoke comprising a cylindrical segment between the periphery of said axial cam and the casing and of an arcuate extent substantially equal to the angular distance between pistons, a pair of ears forming end faces on each yoke member; bearings between the ears and opposite faces of the axial cam, and cooperating guide surfaces on the cylindrical segment and on the casing for guiding the motion of the segment, said guide surfaces being located on the entering side, with respect to the motion of the axial cam, of the cylindrical segment.

5. In combination, a rotatable shaft, an axial cam secured thereto, a plurality of pistons parallel to the shaft, said pistons being all on the same side of the axial cam and uniformly spaced around the shaft, a fixed casing enclosing the axial cam; a movable yoke member attached to each piston and straddling the axial cam, each yoke comprising a cylindrical segment between the periphery of said axial cam and the casing and of an arcuate extent substantially equal to the angular distance between pistons, a pair of ears forming end faces on each yoke member; bearings between the ears and oppoiste faces of the axial cam, and cooperating guide surfaces on the cylindrical segment and on the casing for guiding the motion of the segment.

6. In combination, a rotatable shaft, an axial cam secured thereto, a plurality of pistons parallel to the shaft, said pistons being all on the same side of the axial cam and uniformly spaced around the shaft, a fixed casing enclosing the axial cam; a movable yoke member attached to each piston and straddling the axial cam, each yoke comprising a cylindrical segment between the periphery of said axial cam and the casing, of an arcuate extent substantially equal to the angular distance between pistons, a pair of ears forming end faces on said yoke member; bearings sliding on the opposite faces of the axial cam, and means rotatably supporting the bearings from the ears.

7. In combination with a reciprocating piston and a rotary shaft parallel with the longitudinal axis of the piston and having an inclined axial cam, means interconnecting the piston with the axial cam comprising an arcuate yoke straddling the axial cam and resting thereon, said yoke having ears on opposite sides of the axial cam, bearing shoes between the axial cam and the inner surfaces of the ears, the piston being connected to and exerting a pressure against the outer surface of one of said ears, the center of pressure being spaced from the center of the bearing and in advance thereof with respect to the direction of rotation of the axial cam.

8. In combination with a reciprocating piston and a rotary shaft parallel with the longitudinal axis of the piston and having an inclined axial cam, means interconnecting the piston with the axial cam comprising a yoke straddling the axial cam, said yoke having flexible ears on opposite sides of the axial cam, bearing shoes between the axial cam and the inner surfaces of the ears, a piston rod connected to and exerting a pressure against the outer surface of one of said ears, the piston having a skirt engaging the outer surface of one of the ears whereby said ear is maintained against flexing in one direction by the piston skirt and in the opposite direction by one of the bearing shoes.

9. In combination with a reciprocating piston and a rotary shaft parallel with the longitudinal axis of the piston and having an inclined axial cam, means interconnectnig the piston with the axial cam comprising a yoke straddling the axial cam, said yoke having flexible ears on opposite sides of the axial cam, bearing shoes between the axial cam and the inner surfaces of the ears, a piston rod connected to and exerting a pressure against the outer surface of one of said ears, the piston having a skirt engaging the outer surface of one of the ears whereby said ear is maintained against flexing in one direction by the piston skirt and in the opposite direction by one of the bearing shoes, means forming a cylinder for said piston, said cylinder being of a length in excess of the stroke of the piston by an amount less than 50% of the diameter of the piston, the engagement of the ear with the piston skirt holding the extended end of the piston against tilting when the piston is in its outermost position in the cylinder.

10. In combination with a rotatable shaft having an inclined axial cam rigid therewith, a fixed circular casing enclosing the axial cam, a slidable yoke between the cam and the casing, said yoke comprising an arcuate portion the outer surface of which presses against the inner surface of the casing and the inner surface of which comprises a segment of a bearing sleeve for the axial cam, said yoke having inwardly extending ears embracing the axial cam, rotatable bearing shoes on the inner sides of the ears and sliding on the opposite surfaces of the axial cam, and a tongue and groove connection between the yoke and the casing and extending substantially parallel to the axis of the shaft for guiding the yoke.

11. In combination with a rotatable shaft having an inclined axial cam rigid therewith, a structure including a circular casing enclosing the axial cam, a slidable yoke between the plate and the casing, said yoke comprising an arcuate portion the outer surface of which presses against the inner surface of the casing and the inner surface of which comprises a segment of a bearing sleeve for the axial cam, said yoke having inwardly extending ears embracing the axial cam, rotatable bearing shoes on the inner sides of the ears and sliding on the opposite surfaces of the axial cam, and a sliding connection between the yoke and the casing and extending substantially parallel to the axis of the shaft for guiding the yoke while permitting a pivotal movement thereof sufficient to take up the clearance space between the yoke and the casing, said connection being located on that side of the arcaute portion which is the entering side with respect to the direction of rotation of the axial cam.

12. In combination with a rotatable shaft having an inclined axial cam rigid therewith, a fixed circular casing enclosing the axial cam, a plurality of yokes around the periphery of the plate, each yoke comprising an arcuate portion the outer surface of which presses against the inner surface of the casing and the inner surface of which comprises a segment of a bearing sleeve for the axial cam, said segments together substantially completely covering the entire periphery of the axial cam, each yoke having inwardly extending ears embracing the axial cam, rotatable bearing shoes on the inner sides of the ears and sliding on the opposite surfaces of the axial cam, and means for holding the yokes against rotating with the axial cam while permitting sliding of the yokes in the casing.

13. In combination with a reciprocating piston and a rotary shaft parallel with the longitudinal axis of the piston and having an inclined axial cam, means interconnecting the piston with the axial cam comprising a yoke straddling the axial cam, said yoke having ears on opposite sides of the axial cam, bearing shoes between the axial cam and the inner surfaces of the ears, a piston rod extending from the piston and connected to and exerting a pressure against the outer surface of one of said ears, the center of pressure being spaced from the center of the bearing and in advance thereof with respect to the direction of rotation of the axial cam.

14. In combination, a rotatable shaft, an axial cam secured thereto, a piston parallel to the shaft, a fixed casing enclosing the axial cam; a movable yoke member attached to the piston and straddling the axial cam, said yoke comprising a cylindrical segment between the periphery of said axial cam and the casing, a pair of ears forming end faces on said yoke member; bearings between the ears and opposite faces of the axial cam, and cooperating guide surfaces on the cylindrical segment and on the casing for guiding the motion of the segment, said yoke being pivoted at the guide surfaces to allow movement to an extent required to take up clearance spaces between the cylindrical segment and the casing and between the cylindrical segment and the axial cam.

15. In combination, a rotatable shaft, an axial cam secured thereto, a piston parallel to the shaft, a fixed casing enclosing the axial cam; a movable yoke member attached to the piston and including a pair of ears straddling the axial cam, bearings between said ears and opposite faces of the axial cam, a driving connection between the piston and one of the ears, said one ear being tapered to a greater thickness on the part thereof which is on the leaving side with respect to the motion of the axial cam, to locate the center of pressure between the associated bearing and the axial cam for wedge film lubrication.

16. In combination with a rotatable shaft having an inclined axial cam rigid therewith, a stationary structure including a fixed circular casing enclosing the axial cam, a slidable yoke between the plate and the casing, said yoke comprising an arcuate portion and inwardly extending ears embracing the axial cam, rotatable bearing shoes between the ears and the axial cam, said arcuate portion comprising inner and outer radial bearings, said yoke and stationary structure including coacting guide surfaces parallel to the shaft and located on the entering side of the yoke with respect to the motion of the axial cam, said yoke including tangential bearings located on a line passing through the axis of the bearing shoes and in a direction perpendicular to a plane determined by the axis of the shaft and the axis of the bearing shoes, said tangential bearings permitting a slight pivotal action of the arcuate portion at said guide surfaces.

ZORRO D. RUBEN.